United States Patent [19]

Aceti et al.

[11] Patent Number: 4,662,053

[45] Date of Patent: May 5, 1987

[54] APPARATUS AND METHOD FOR ASSEMBLING GEARS

[75] Inventors: John G. Aceti, Princeton Junction; Robert E. Schneller, Bricktown, both of N.J.

[73] Assignee: RCA Corporation, Princeton, N.J.

[21] Appl. No.: 663,151

[22] Filed: Oct. 22, 1984

[51] Int. Cl.⁴ .......................................... B23P 19/00
[52] U.S. Cl. ........................... 29/429; 29/159.2; 29/466; 29/786; 29/787; 29/809; 29/821; 29/822; 29/434; 198/420; 221/133; 221/200; 414/224
[58] Field of Search ............... 29/771, 786, 787, 790, 29/809, 821, 822, 434, 464, 466, 469, 718, 793, 159.2, 429; 414/222, 224; 198/420; 221/200, 133, 93, 95; 74/421 R

[56] References Cited

U.S. PATENT DOCUMENTS

| | | | |
|---|---|---|---|
| 2,336,573 | 12/1943 | Seeley | 29/790 X |
| 2,604,692 | 7/1952 | Broden | 29/790 X |
| 2,709,923 | 6/1955 | Manning | 29/469 X |
| 2,752,618 | 7/1956 | Stern | 221/95 X |
| 3,005,255 | 10/1961 | Wilson | 29/790 X |
| 3,104,458 | 9/1963 | Conviser | 29/790 |
| 3,328,873 | 7/1967 | Schweers | 29/718 X |
| 3,355,789 | 12/1967 | Tetsull | 29/434 X |
| 3,554,043 | 1/1971 | Luckner, Jr. | 74/421 R X |
| 4,473,935 | 10/1984 | Tatsuura et al. | 29/429 |

FOREIGN PATENT DOCUMENTS

| | | | |
|---|---|---|---|
| 142825 | 7/1980 | Fed. Rep. of Germany | 29/271 |
| 136161 | 11/1978 | Japan | 29/434 |
| 795854 | 1/1981 | U.S.S.R. | 29/771 |
| 854671 | 8/1981 | U.S.S.R. | 29/786 |

Primary Examiner—Howard N. Goldberg
Assistant Examiner—Joseph M. Gorski
Attorney, Agent, or Firm—Joseph S. Tripoli; William Squire

[57] ABSTRACT

A gear train is assembled by vibratory feeding each of its gears into a nest in overlapping meshed aligned spaced relation. A fastening nut is vibratory fed in alignment with the journal for the gear which is distal the bracket to which the gear train is to be secured. The bracket includes a plurality of journals each mating with the journal bearing of a corresponding gear located in the nest. A robotic arm carries the bracket and inserts the journals into the gears in an axial direction, passing the journal for the distal gear through that gear bearing and into the nut for capturing the overlapped nested gears between the nut and the bracket.

19 Claims, 10 Drawing Figures the gears 22, 24, and 26 are in their assembled meshed overlapping relation.

APPARATUS AND METHOD FOR ASSEMBLING GEARS

This invention relates to the automatic assembly of gears.

Spur gears, among other kinds, are widely employed in gear trains for transferring motion or power from the driving gear to the last driven gear in the train. Often such trains comprise a number of compound gears each secured for rotation about a common journal bearing. The compound gears may be meshed in the train in nested overlapping spaced relation to achieve multiplication or division of power or speed in a known way.

Because of the overlapping relationship of such compound gears, the gears need to be assembled to their corresponding journals in some predetermined sequence. The last assembled gear may captivate the previously assembled gears in the assembly.

Such gear trains are often assembled manually because of the need to assemble the gears both in the predetermined sequence and to insure that the teeth of the different gears mesh. The assemblies sometimes may be completed automatically by a machine. In one such automatic system, a robotic arm lifts the gears one at a time to place them on the designated journal. The robotic arm assembles subsequent gears of the train by sliding each gear over its corresponding journal and meshing the teeth of the previously assembled gear with the next succeeding gear.

Often the robotic arm may misorient the presently carried gear precluding its meshing with the previously assembled gear. Sensors may be included in the system for sensing this nonmeshed condition for reorienting the robotic arm in an attempt to achieve a meshed state. The robotic arm repetitively attempts to assemble this latter gear until the sensors indicate the gears are properly meshed. This sequence is then repeated for each of the gears. Such an assembly technique, whether manual or automatic, tends to be slow, cumbersome, and uneconomical.

In accordance with the present invention, an apparatus for meshing a plurality of gears includes alignment means which receive and locate at least two of the gears in preassigned relative locations. A second means places one of the at least two gears in its preassigned location in the alignment means. A third means feeds and vibrates the other of the two gears into its preassigned location against its mating gear to rotate the other gear relative to its mating gear when the gears contact and to apply a force on the other gear to move it into its preassigned location when the other gear teeth are aligned in meshed relation with the mating gear teeth.

Figure 6:
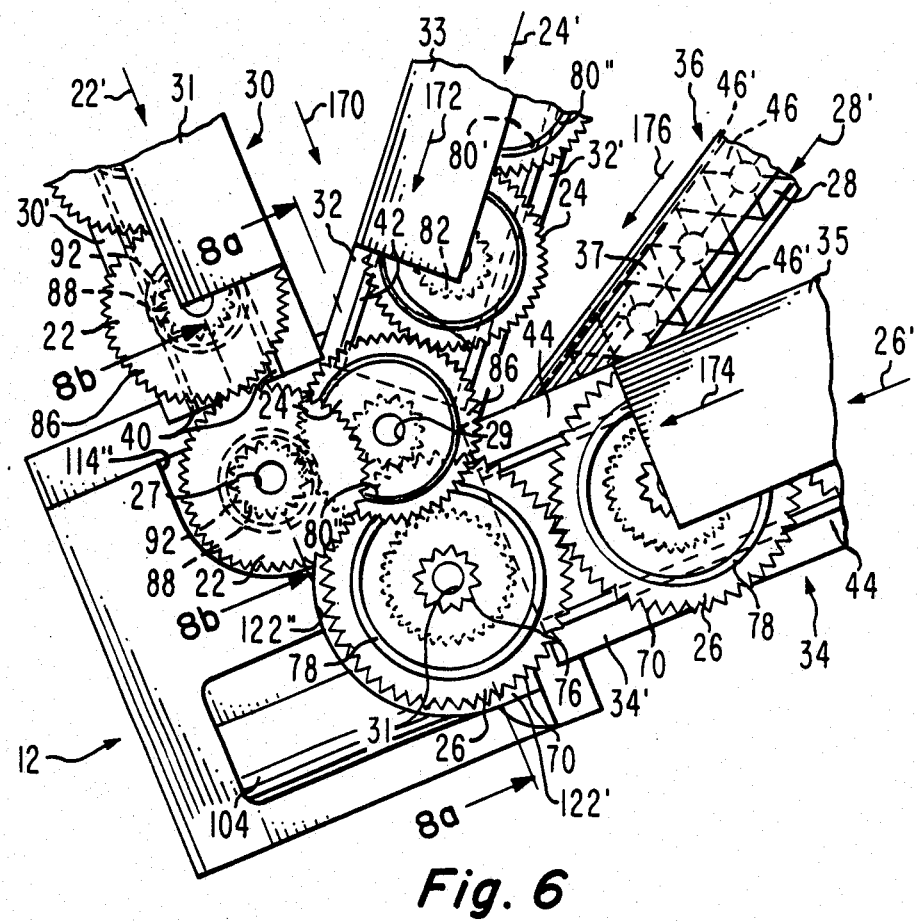
FIG. 6 is a plan view similar to the view of FIG. 3 with the gears and fastening means included.
Figure 8B:
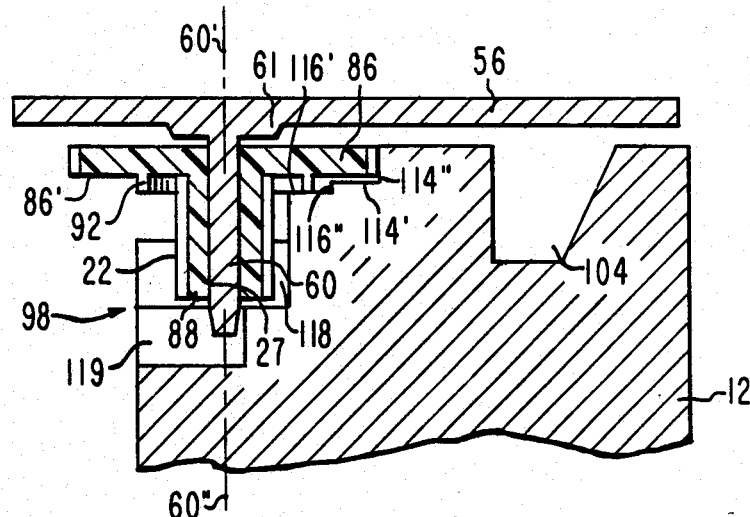
Figure 8A:
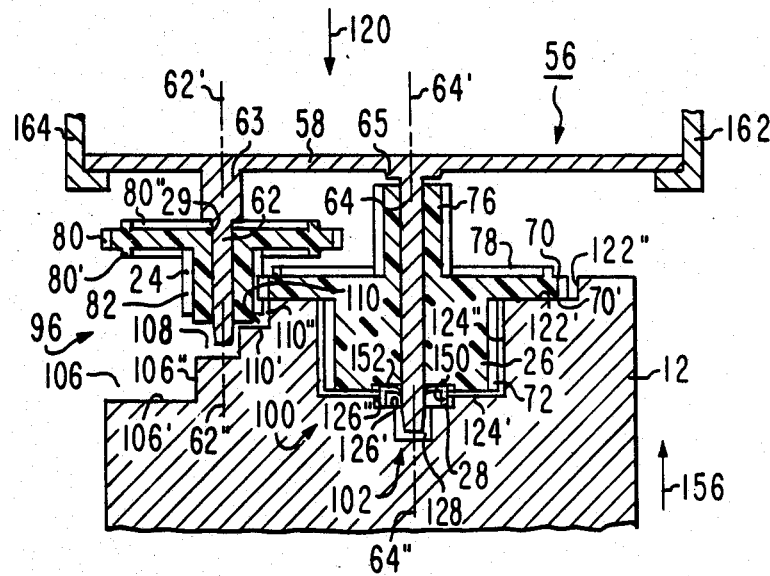
Figure 9:
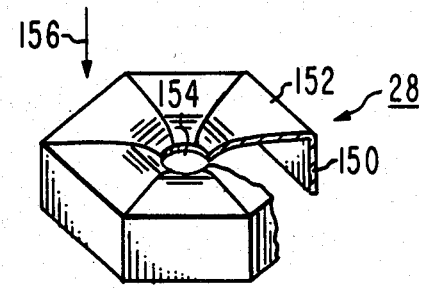

FIGS. 8a and 8b are sectional elevation views through the nest and gear assembly of FIG. 6 taken along lines 8a—8a and 8b—8b respectively, and further including a robotic arm fed gear support bracket; and FIG. 9 is an isometric view of a fastening nut employed in the embodiment of FIG. 8a.

Figure 1:
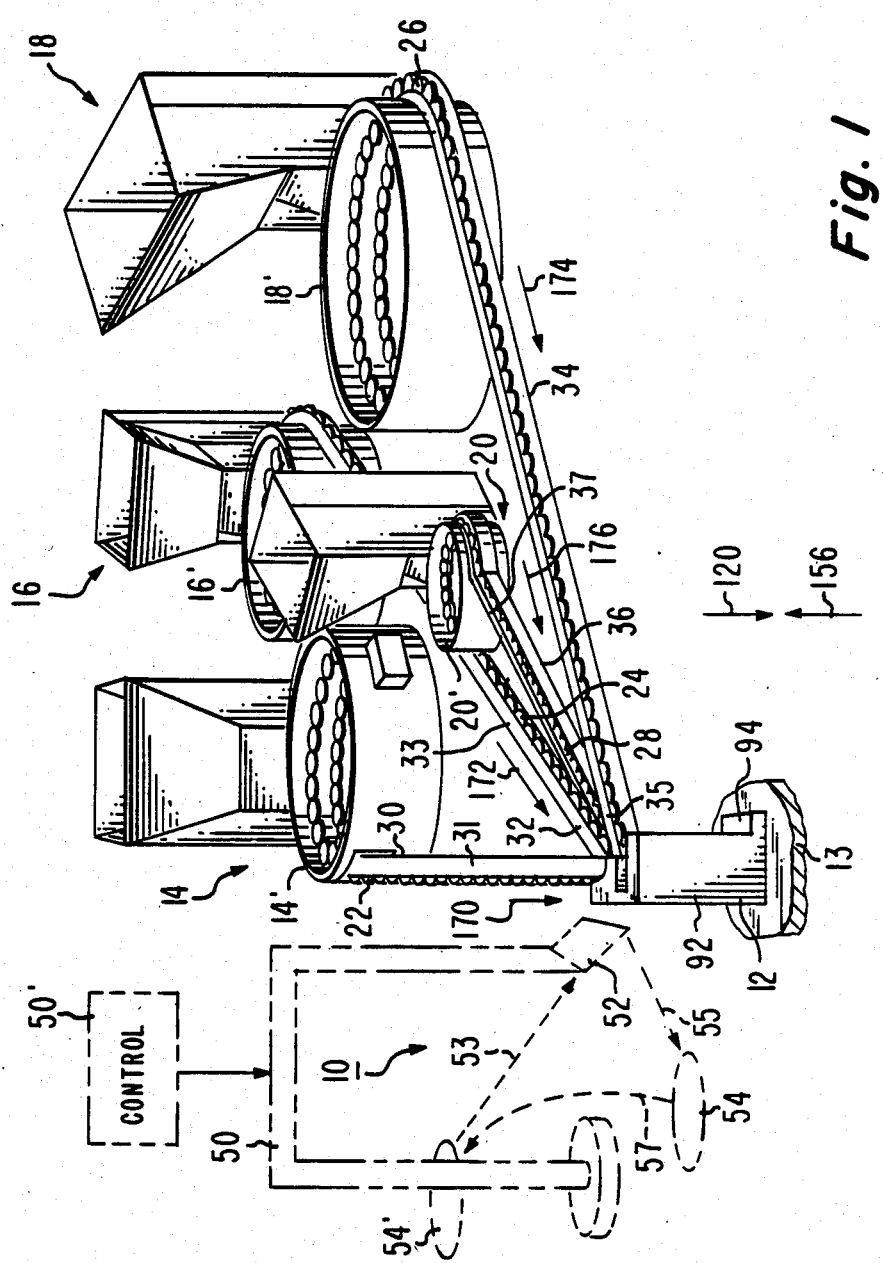
FIG. 1 is a perspective view of one embodiment of the present invention including vibratory feed means.
Figure 7:
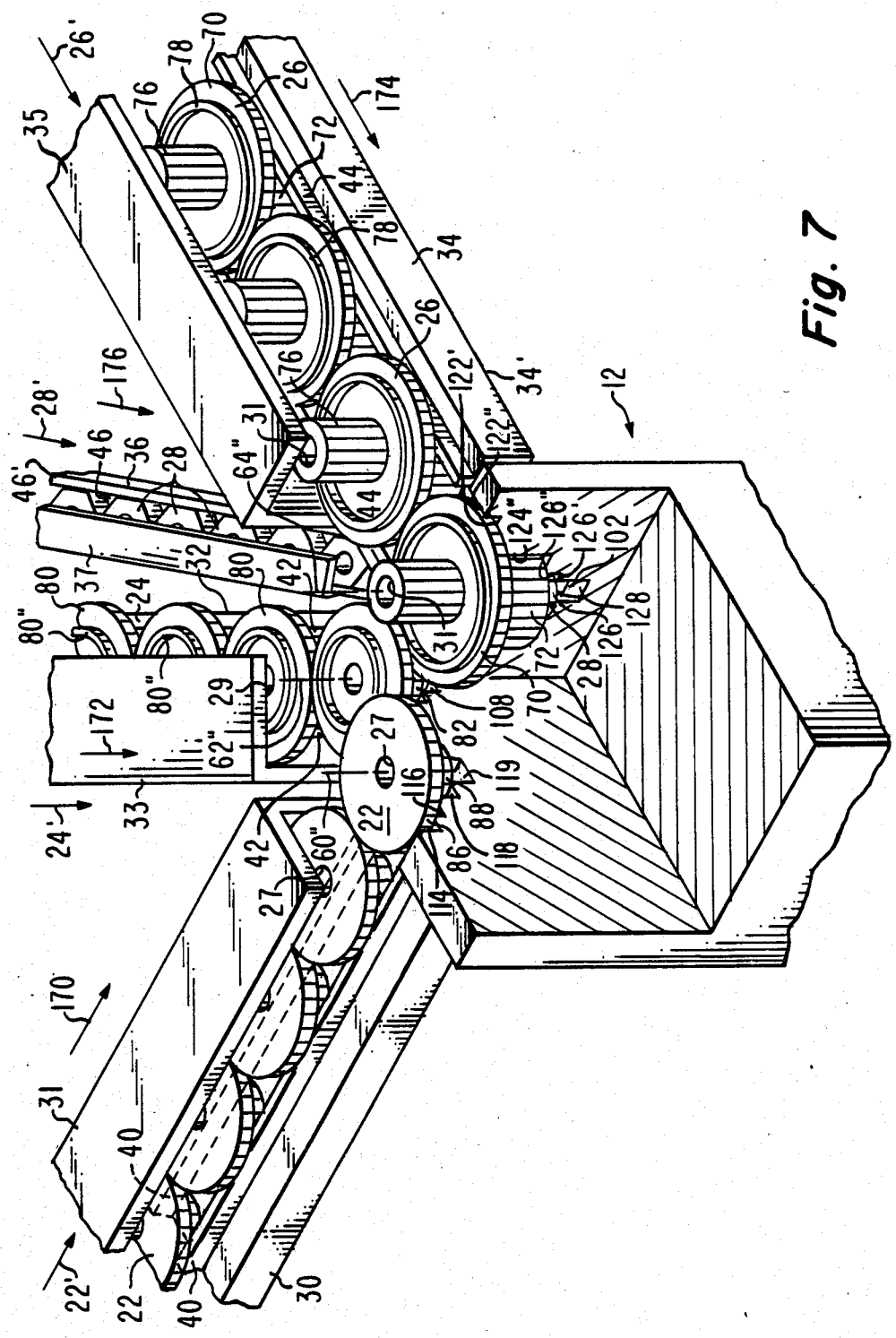
FIG. 7 is an isometric view somewhat diagrammatic and partially in section of the embodiment of FIG. 6.

In FIG. 1, apparatus 10 includes a gear and fastener alignment nest 12 secured to system support 13. Vibratory feed apparatuses 14, 16, 18, and 20 secured to support 13, respectively feed and orient compound spur gears 22, 24, 26 and nuts 28 (FIGS. 6 and 7). Gears 22, 24, 26, and nuts 28 are respectively fed from vibrating feed bowls 14', 16', 18', and 20' on respective corresponding downwardly inclined vibrating feed tracks 30, 32, 34, and 36 to nest 12. The nest 12 locates one of each type of the previously oriented gears and a nut of a given assembly in predetermined relative spaced alignment and orientation. The tracks vibrate the gears and nuts carried thereby meshing the gears and forcing them and the nut against mating locating elements of nest 12 at nut alignment openings 96, 98, 100, and 102, FIG. 2.

Figure 4:
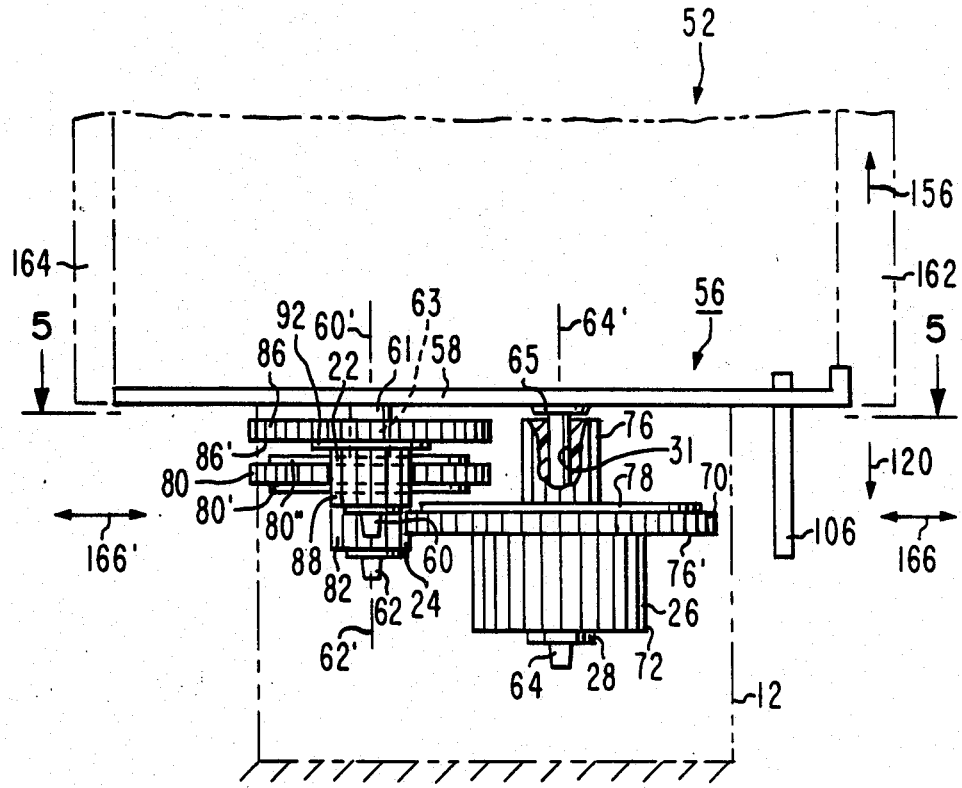
FIG. 4 is a side elevation view, partially in phantom, of a gear train assembly assembled by the embodiment of FIG. 1.

Robotic system 50, FIG. 1, assembles journaled bracket 58, FIG. 4, to the aligned gears and nut in the nest 12 to form assembly 56. To do this, the bracket journals 60, 62, and 64, FIG. 4, are passed through corresponding gear journal bearings. One journal 64 is also passed through and attached to the aligned nut 28 which captivates one of each aligned gears 22, 24, and 26 in the nest to the bracket 58. FIG. 4. The robot 50 lifts the bracket and gear assembly 56 vertically off the nest, deposits the assembly elsewhere. The robot then returns to the nest 12 with a new bracket on to which to assemble a new set of gears and nut which have been fed to the nest in the interim. The assembly 56 and apparatus 10 will be explained in more detail below.

In FIGS. 4, 8a, and 8b gear assembly 56 comprises support bracket 58 which may be a flat die cast metal plate from which depend three gear spacing bosses 61, 63, and 65 and from which bosses depend three respective gear journals 60, 62, and 64. Other appendages, such as element 106 employed for other purposes, may also depend from bracket 58. Journals 60, 62, and 64 are parallel circular cylindrical rods concentric with respective axes 60', 62', and 64'. Journals 60, 62, and 64 rotatably receive corresponding mating, meshed, overlapping gears 22, 24, and 26 via respective gear bearings 27, 29, and 31. Nut 28 is frictionally engaged with journal 64, locking gear 26 to journal 64. None of the other journals 60 and 62 have a nut attached thereto. Nut 28 captures gear 26 and thus the nested overlapping gears 22 and 24 to the bracket 58.

Figure 5:
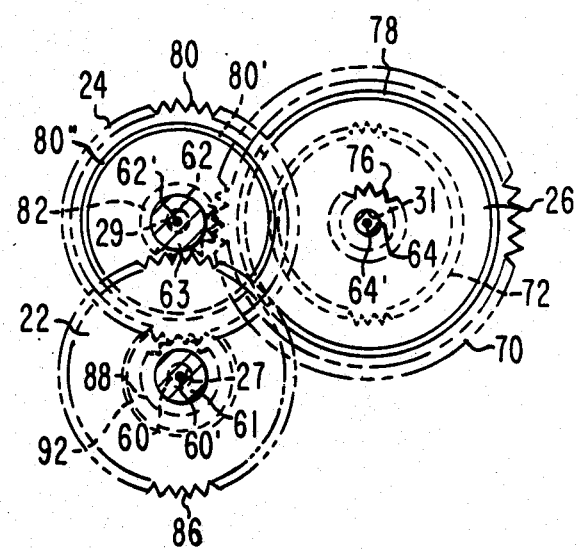
FIG. 5 is a plan sectional view through the assembly of FIG. 4 taken along lines 5—5.

The gears 22, 24, 26 are relatively lightweight structures comprising thermoplastic material, for example. Gear 26, FIGS. 4 and 5, is a compound spur gear comprising two pinions 72 and 76 and a larger diameter central gear 70. A circular rib 78 concentric with these gears extends from the upper surface of gear 70. Gears 70, 72, and 76 are concentric with bearing 31 and rotate on journal 64 about axis 64'. The extended journal end of gear 76 abuts boss 65 which spaces gear 26 from bracket 58 relative to the remaining gears.

Gear 24 is a compound spur gear comprising a large diameter gear 80 smaller than gear 70 and a pinion 82. A circular rib 80' depends from, is concentric with gear 80 and abuts rib 78 of gear 70 in sliding engagement when the gears rotate. A circular rib 80" extends from and is concentric with gear 80. Gears 80 and 82 are concentric with bearing 29 and rotate on journal 62 about axis 62'. Gear 82 meshes with and drives gear 70. One end of journal 29 abuts boss 63 in the desired spaced position from bracket 58 so that pinion 82 is aligned with meshed gear 70. Gear 70 and boss 63 captivate gear 24.

Gear 22, FIGS. 4 and 8b, is a compound spur gear comprising a large diameter gear 86 of about the same diameter as gear 80 and a pinion 88. A circular rib 92 depends from and is concentric with gear 86. Gears 86 and 88 are concentric with bearing 27 and rotate on journal 60 about axis 60'. Pinion 88 meshes with and drives gear 80. An end of journal 27 abuts boss 61. Gear 86 is spaced by boss 61 between bracket 58 and gear 80 and is captivated by them. The gear train assembly translates relatively high speed, low power applied to gear 86 by an external gear (not shown) to low speed at pinion 76 where an additional external gear (not shown) may be driven.

Figure 3:
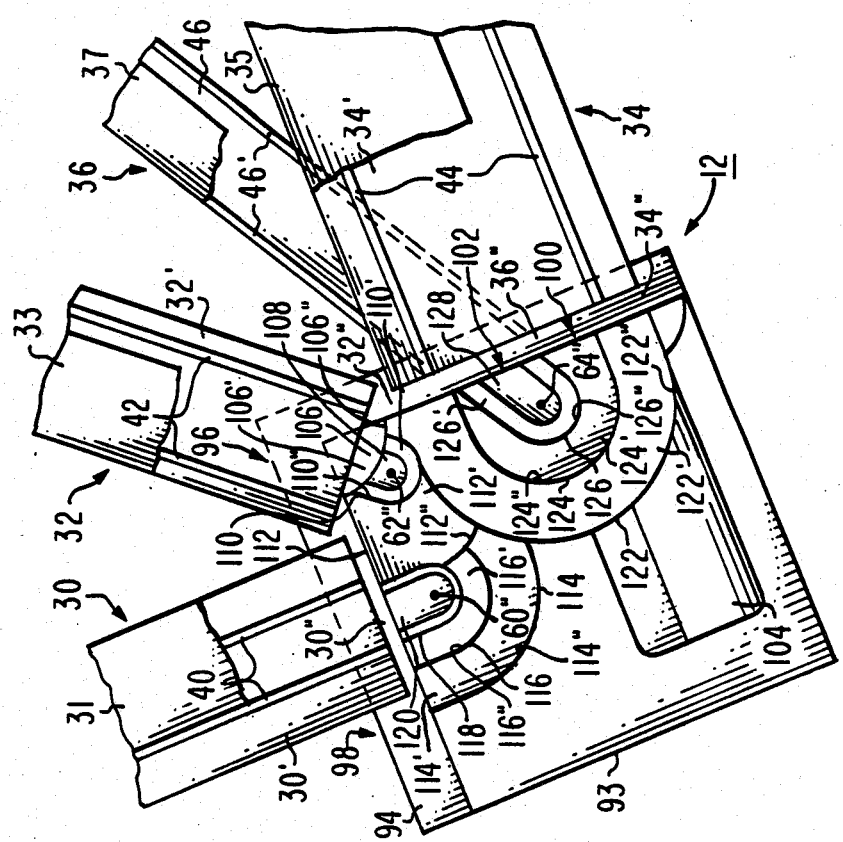
FIG. 3 is a plan view, partially in section, of the nest and portions of the vibrating feed means of FIG. 1.

FIG. 3 shows in plan view from above, the ends of the feed tracks at the nest 12. Track 30 comprises a bed 30' and two upstanding parallel gear carrying guide rails 40. A cover 31 is secured to bed 30 over and spaced from rails 40. Track 32 comprises a bed 32' and two upstanding parallel gear carrying guide rails 42. A cover 33 is secured to bed 32' over and spaced from rails 42. Track 34 comprises a bed 34' and two upstanding parallel gear carrying guide rails 44. A cover 35 is secured to bed 34' over and spaced from rails 44. Track 36 comprises a channel 46 between upstanding parallel walls 46' forming a chute. A cover 37 is secured to track 35 over channel 46. The channel 46 slidably receives fastening nuts 28 in the orientation of FIG. 8a. The rails 40, 42, and 44 and channel 46 support and feed the oriented gears and nuts onto the nest 12 into their assigned nest positions defined by nest 12 openings 96, 98, 100, and 102, FIG. 2. Not shown are vibrating mechanisms for vibrating each of the tracks in a known way.

Each of the tracks 30, 32, 34, and 36 is secured spaced from the nest 12 in vibration isolation therefrom. For this purpose, the terminated ends of the different tracks are suspended closely spaced from nest 12, FIG. 3, in the horizontal direction at gaps 30", 32", 34", and 36" and in the vertical direction. Each track corresponds to and is aligned with a separate, different locating alignment opening of nest 12. In FIG. 3, track 30 corresponds to opening 98, track 32 corresponds to opening 96, track 34 corresponds to opening 100 and track 36 corresponds to opening 102.

The feed apparatuses 14, 16, 18, and 20, FIG. 1, simultaneously and continuously feed each of the respective gears and nuts to the nest 12 and automatically mesh the gears as they fall into the nest 12, FIGS. 6, 7, 8a and 8b, prior to the assembly of the bracket 58, FIG. 4.

Track 30 rails 40, FIG. 6, support and orient gear 22 rib 92 by gravity. Rib 92 protects the gear teeth from damage during the feeding. The rails 40 are spaced apart to form a channel which receives and guides pinion 88 onto the nest 12. Gear rib 92 slides on the upper edges of track rails 40, FIGS. 6 and 7, which position the gear 22 into nest 12. The lead gear of column 22' of gears on that track is forced by the mass and vibratory motions of that column into its assigned nest position. The gears on the track are continuously vibrated and are immediately ready to march on the downwardly sloping track 30 into the next available space in nest 12 when the lead gear of the column is assembled to the gear train assembly 56 and removed from the nest with that assembly.

Similarly, track 32 rails 42 support by gravity the gear 24 rib 80'. Rib 80' protects its gear teeth from damage during feeding. The rails 42 are spaced apart to form a channel which receives and guides the pinion 82. Rails 42 position the oriented lead gear 24 into nest 12, the vibrations of mass and column 24' on track 32 forcing the lead gear into its assigned position in the nest 12. The gears on this track are vibrated so that they too are ready to march, one at a time, into their assigned location in nest 12. In similar fashion column 26' of preoriented gears 26 carried by rails 44 of track 34 are fed to nest 12, gear 70 undersurface 76' riding on rails 44. Oriented nuts 28 are also continuously fed to nest 12 by their vibrating downward sloping track 36.

All of the nuts and gears in their respective columns tend to vibrate and move down their sloping tracks due to such vibrations. The columns, due to their length, provide masses that tend to provide forces on the lead gears and nut sufficient to force them into place in the nest, meshing the mating gears and keeping them there until assembled in assembly 56, FIG. 4, and removed from the nest by arm 52.

As each gear is gently moving down the vibratory track, it becomes susceptible to changes in its orientation; because each gear is propelled repeatedly from the corresponding vibrating feed track for a split second and is in midair for that time. Each gear while in midair presents negligible resistance to applied forces and therefore tends to rotate if it tangentially encounters another object. These dynamics allow the rotation of one gear relative to another, if at least one gear is vibrating. Typically, one gear reaches the locating nest 12 first and comes to rest. Then an adjacent gear will follow and try to position itself, next to the first gear, due to its forward motion. When the second gear tangentially impacts the first, it will tend to rotate, due to the imparted vibrations of that column of gears, thus allowing its teeth to mesh with the first. Rotation will take place until the gear is positioned by the locating walls of the nest to be described and the teeth meshed. This same sequence may take place many more times with many other gears. It is not necessary to have a sequential meshing of gears, but an almost simultaneous meshing of many gears can occur so long as one of two adjacent gears are permitted to rotate.

The tracks 30-36 are made sufficiently long to insure sufficient retaining force on the gears and nut located on the nest 12 by the mass of the vibrating columns 22', 24', 26', and 28'. That force is sufficient to insure that the nested gears and nut in nest 12 are forced against their respective nest locating surfaces and are kept in those assigned locations until assembled to bracket 58. By way of example, the tracks may be about two feet long in one implementation for gears and nuts having a weight of a fraction of an ounce each.

In operation of the feed system, the tracks are filled with the gears and nuts. The many elements on the track add momentum to the forward moving gears and add to the speed at which the meshing sequence takes place. Also, the large mass of the elements on the tracks tends to keep the meshed gears in the locating nest, for the vibratory motion against the lead gear or nut in the nest may tend to otherwise vibrate the meshed gear or nut out of the nest. The covers 31, 33, 35, and 37 over the respective tracks, FIG. 3, overlap about 50% the gear and nut next adjacent to the lead gear and nut in the nest. The edges of the respective covers is shown in phantom in FIG. 6. Not shown in FIG. 6, but located similarly, is a cover 37 over track 36. The purpose of the covers will be explained below.

Figure 2:
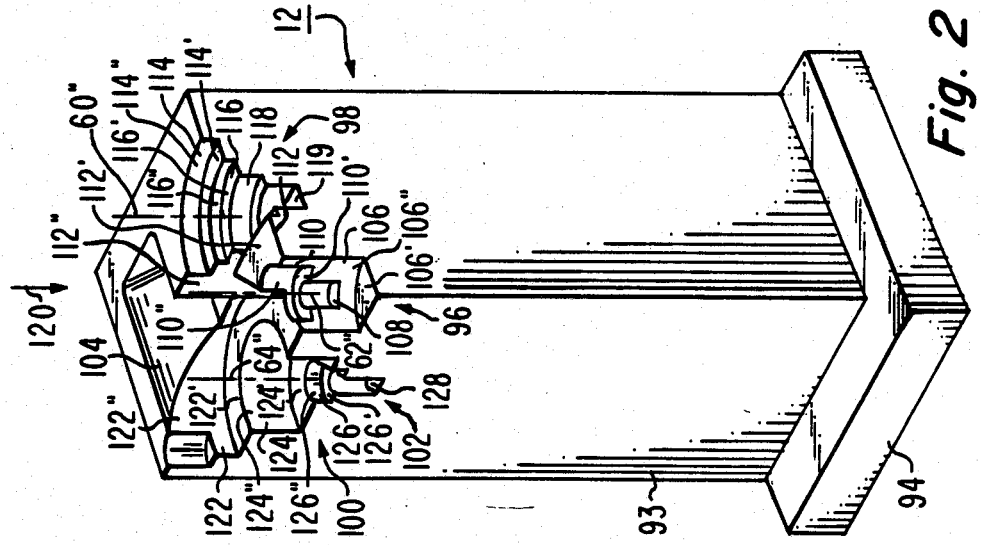
FIG. 2 is an isometric view of a gear and fastening means alignment nest employed in the embodiment of FIG. 1.

In FIGS. 2 and 3, gear and nut alignment nest 12 serves to receive and locate the moving, vibrating different preoriented gears and nuts in their assigned spaced relationship in the assembly 56. The nest 12 comprises a block 93 which may be aluminum, upstanding from a base 94 secured to system support 13, FIG. 1. Block 93 has a set of gear and nut alignment openings 96, 98, 100, and 102, and a recess 104. Opening 102 aligns nut 28 on nest axis 64″, opening 96 aligns gear 24 on nest axis 62″, opening 98 aligns gear 22 on nest axis 60″, and opening 100 aligns gear 26 on nest axis 64″. Recess 104 receives a bracket 58 appurtenance (not shown). The openings 96, 98, 100, and 102 each comprise a plurality of stepped recesses all aligned on respective axes 62″, 60″, 64″, and 64″. Nest 12 axes 60″, 62″, and 64″, FIGS. 8a and 8b, correspond to assembly 56 respective journal axes 60′, 62′, and 64′, FIG. 4, and have substantially the same relative spacing and orientation, the nest 12 being shown in phantom in FIG. 4.

Opening 96 has a recess 106 formed by a horizontal wall 106′ and vertical wall 106″ for receiving track 32 spaced therefrom. Opening 96 also includes a journal 62 receiving recess 108, a pinion 82 receiving recess 110 and a gear 80 receiving and locating recess 112, all aligned on axis 62″. Recess 112 has a semicircular cylindrical segment vertical gear locating wall 112″ concentric with axis 62″ and which abuts and locates the teeth of received gear 80 concentric with axis 62″. This locates journal 62 concentric with axis 62″. Recess 112 has a horizontal gear 80 plane locating shoulder 112′, on which rib 80′ rests and is vertically located. Shoulder 112′ locates gear 24 vertically relative to the other gears in direction 120 parallel to axis 62″.

Recess 110 has a horizontal semicircular pinion 82 clearance shoulder 110′ concentric with axis 62″ and which is spaced from the undersurface of the received, nested pinion 82, FIGS. 2, 3, and 4. Pinion 82 is positioned in recess 110 with its teeth spaced from the vertical semicircular cylindrical segment side wall 110″, FIGS. 2 and 7. Recess 108 has a depth in vertical direction 120 and a transverse dimension normal to direction 120 sufficient to receive journal 62, FIG. 4, in spaced relation thereto when the bracket 56 is assembled to the gears in the nest in direction 120, FIG. 4.

The upper edges of track 32 rails 42 are spaced above the plane of locating shoulder 110′ where track 32 is closest to nest 12, it being recalled that rails 42 carry gear 24 rib 80′. This spacing is such that gear 24 falls by gravity slightly into opening 96 from track 32. This drops rib 80′, FIG. 4, onto locating shoulder 112′. The column 24′, FIG. 6, of gears 24 on track 32 forces the abutting nested gear 82 teeth in direction 172, FIGS. 6 and 7, against locating wall 110″ and rib 80′ on locating shoulder 112′.

Opening 98 comprises stepped recesses 114, 116, 118, and 119 for receiving gear 22 and journal 60. Recess 114 has a semicircular cylindrical segment vertical side wall 114″ concentric with axis 60″ and horizontal shoulder 114′ for receiving gear 86. Wall 114″ abuts and embraces received gear 86 teeth for locating the gear 22 journal bearing 27 aligned on axis 60″. Lower surface 86′ of gear 80, FIG. 86, is spaced above horizontal shoulder 114′ when gear 22 is nested. Recess 116 comprises horizontal plane wall 116′ and vertical semicircular cylindrical segment wall 116″ concentric with axis 60″. Wall 116″ is spaced from the outer edge of received gear 22 rib 92. Rib 92 rests on horizontal shoulder 116′ which locates gear 22 vertically relative to the other gears parallel to axes 60″, 62″, and 64″. When so located, pinion 88 is meshed with gear 80, FIG. 4. Recess 118 has a vertical semicircular cylindrical segment side wall concentric with axis 60″ and a plane horizontal shoulder which are spaced from received adjacent nested pinion 88 surfaces, FIG. 8b. Lowermost recess 119 provides clearance for the lower tip of received journal 60 when the bracket 58 is assembled to the nested gears.

The upper edges of rails 40 of track 30, FIGS. 3 and 7, are spaced slightly above the plane of shoulder 116′ where track 30 is closest to nest 12, it being recalled that the track 30 rails 40 carries rib 92. This spacing is such that gear 22 falls a small distance by gravity into opening 98 from track 30. The column 22′ of gears 22 on track 30, FIGS. 6 and 7, applies sufficient force to the nested gear 22 in direction 170 to keep that nested gear rib 92 located on shoulder 116′ and the teeth of gear 86 abutting wall 114″.

Opening 100, FIGS. 2, 3, and 8a, comprises recesses 122 and 124. Recess 122 has a gear 70 semicircular horizontal locating shoulder 122′ and a semicircular cylindrical segment vertical locating side wall 122″. Recess 124 has a semicircular horizontal shoulder 124′ and a semicircular cylindrical segment vertical side wall 124″. Side walls 122″ and 124″ are concentric relative to axis 64″. Opening 100 receives a gear 26 and aligns that gear concentric with nest axis 64″. The outer peripheral edge of gear 70 teeth when nested abut locating embracing side wall 122″ aligning journal bearing 31 on axis 64″. The undersurface 70′ of gear 70 rests on and is located vertically relative to the other nested gears by shoulder 122′. Walls 124′ and 124″ are spaced from pinion 72 to provide clearance for that pinion when nested.

The upper edges of track 34 rails 44 adjacent to nest 12 carry the undersurface 70′ of gear 70, FIG. 4, slightly above the plane of shoulder 122′ so that gear 70 drops slightly by gravity onto shoulder 122′ when fed thereto. The column 26′ of gears 26 on track 34 provide sufficient force in direction 174, FIG. 7, on the nested received gear 26 to keep that gear in place abutting shoulder 122′ and wall 122″.

Opening 102 has stepped recesses 126 and 128. Recess 126 comprises a nut 28 locating semicircular cylindrical segment and elongated vertical side wall 126″ and a nut 28 locating horizontal plane shoulder 126′. Vertical side wall 126″ forms a slot with a cylindrical semicircular segment end wall which is concentric with nest axis 64″. Wall 126″ locates the nut 28 aperture 154, FIG. 9, concentric with and aligned on axis 64″. Shoulder 120′ is located vertically relative to the gear locating shoulders to position the received nut 28 sufficiently below pinion 72 to align the nut 28 and gear 70 on axis 64″ without mutual interference, but at a vertical position at which nut 28 can be pierced by journal 64 when assembled thereto.

Recess 128 at the base of opening 102 provides clearance for the extended tip of received journal 64, FIG. 4. The column 28′ of nuts 28 on track 36, FIG. 7, provide sufficient force against the received nested aligned nut 28 to keep that nut in place on axis 64″ abutting locating shoulder 126′ and embraced by wall 126″. The nut 28 is fed on track 36, FIGS. 1 and 8, oriented with its aperture 154 closest to the gear 72, FIG. 8.

In FIG. 9, nut 28, which is commercially available, comprises sheet metal material having a hexagonal side wall 150 and a plurality of inwardly bent radially extending resilient cantilevered gripping fingers 152 terminating in central somewhat circular aperture 154. Aperture 154 has a diameter smaller than the mating journal 64 to which it is to be locked to provide resilient gripping of the journal passed therethrough.

Journal 64 is slid into the smaller diameter aperture 154, FIG. 8, in a vertical direction 120, bending the fingers 152 in direction 120. Cantilevered fingers 152 being spring loaded, engage the inserted journal preventing relative displacement of the journal in a direction 156 opposite direction 120. The extended tip of journal 64, FIG. 8a, is tapered to facilitate it entering the nut 28 aperture 154.

In FIG. 1, a commercially available robotic system 50, shown in phantom, has an arm 52 which is programmed by control 50' to carry a gear support bracket 58, FIG. 4, in a preassigned orientation into alignment with the nest 12. Arm 52 includes a pair of bracket 58 gripping fingers 162 and 164, FIG. 4. Fingers 162 and 164 movably grip the preoriented and prealigned bracket 58 at a remote station 54' (shown in phantom), FIG. 1. Arm 52 transfers, in direction 53, FIG. 1, the gripped empty bracket to the horizontal orientation of FIG. 4, until it is aligned directly above nest 12 in a position not shown.

As mentioned above, bracket 58 has three journal axes 60', 62', and 64', FIG. 4, and nest 12 has three corresponding journal receiving axes 60", 62", and 64", FIGS. 2, 8a, and 8b. Arm 52 aligns the bracket 58 and nest 12 axes substantially coaxial. However, these axes may be misaligned slightly as will be explained later. The arm 52 then moves the bracket 58 in vertical direction 120 toward nest 12 and in so doing, assembles the aligned support bracket journals to the gears and nut, FIG. 4, previously aligned on axes 60", 62", and 64" by the nest 12 to form gear train assembly 56. The arm 52 does this assembly with a single motion in direction 120, FIG. 4.

The arm 52, FIG. 4, then lifts the gear train assembly 56 vertically from nest 12 in direction 156 and transfers it, direction 55, FIG. 1, to a remote receiving location 54 (shown in phantom). Arm 52 then automatically an immediately thereafter returns to the nest 12 in direction 57, FIG. 1, with a second bracket 58 picked up from location 54' and automatically assembles that bracket to a second set of aligned, meshed gears and nut at nest 12. That second set is fed by the feeders and, which in the interim, have been automatically fed into, meshed automatically and aligned in the nest 12. The above process is repetitively carried out.

Not shown is an automatic feed system which may employ a vibratory feed bowl similar to those shown in FIG. 1 for feeding the support bracket 58, FIG. 4, to the arm 52. The brackets, nuts, and gears are automatically repetitively fed to the robot 50 and nest 12 such that the entire assembly process is automatic and rapid.

The vibrations of the tracks are important for not only feeding the various gears and nuts but also to provide rotational forces to the lead gears to insure their meshed engagement as discussed above. That is, the columnar forces produced by a given column of elements on the lead element in combination with the vibrations of that column tend to vibrate and, thus, rotate the lead gear into meshed engagement with the remaining nested, aligned gears.

In FIG. 7, track covers 31, 33, 35, and 37 are not shown. Gear 24 pinion 82 is required to mesh with gear 70. The vibrations of the column 24' of gears 24 and of column 26' of gears 26 and their combined columnar masses tend to force the lead gears 24 and 26 of those columns against each other and vibrate both gears so that they tend to rotate. The last gear into the nest of the given meshed pair rotates as described above, until the gears 82 and 70 mesh. Gear 26 pinion 72 being located by cylindrical side wall 124", locates gear 26 journal bearing 27 on axis 64" aligned with bracket 58 axis 64" to be located above nest 12 by robotic arm 52. Simultaneously therewith, nuts 28, FIG. 7, are fed in their respective column 28' into their stepped recess 126, FIG. 2, until the lead nut rests on locating shoulder 126' and abuts locating vertical side wall 126" beneath nested gear 26.

Alignment of the gear 26 journal bearing 27 and the nut 28 openings 54 can be within a small certain radial range normal to axes 64' and 64". This range is sufficient for the tapered end of journal 64, FIG. 4, to enter the journal bearing 27 and the nut aperture 154. The back pressure of the vibrating columns of gears and nut is sufficiently small relative to the insertion forces of the journals into the gears and nut so as to not interfere with this alignment.

Simultaneously with, prior to or subsequent to the location of gear 26 and nut 28 in the nest, gear 24 is vibratory fed into its opening 96 in nest 12 until its rib 80' rests on shoulder 112', FIG. 2, and gear 80 abuts and is located by vertical side wall 112". At this time, the gear 24 journal bearing 31 is located aligned in spaced relation relative to axis 62', to gear 26 and to nut 28. Gear 80 is meshed with gear 22, and pinions 88 and 82 are meshed with gear 70 by the described vibrating action.

In similar fashion, the remaining gear 22 is vibratory fed into the nest 12 until its rail 92, FIG. 4, rests on shoulder 116' of stepped recess 116, FIG. 2, and abuts vertical wall 116". Gear 22 pinion 88 is meshed with gear 86. Vibrations of the different columns of gears and the combined masses of a given column tend to rotate each of the lead gears, or the last nested gear of a given meshed pair located in the nest 12 until all of the gears mesh. The order of the meshing described above is arbitrary. This meshing action occurs relatively rapidly. Not shown are sensors which may be in nest 12 for sensing the presence and absence of the aligned gears and nut. Such sensors can be used to stop the robot should any of the gears and nut be missing or misaligned in the nest.

The gears and nut 28 being located in the nest 12, arm 52, FIG. 4, transfers the bracket 58 to the vertical position above the nest aligning journal axes 60', 62', and 64' with nest 12 axes 60", 62", and 64", respectively. The arm 52 then moves downward toward the nest, FIG. 8, direction 120, simultaneously inserting the bearing journals 60, 62, and 64 in the corresponding gear bearings 28, 31, and 27. Journals 60 and 62, FIG. 4, are sufficiently long to extend through the corresponding gear bearings. The tips of the journals 60, 62, and 64 are tapered to facilitate entry into the journal bearings. The journal 64 has a length sufficient to pass completely through the pinion 72 of gear 26 and through the aperture 154, FIG. 9, of nut 28 to provide sliding locking friction engagement with the nut 28. By locking the nut 28 to journal 64, the overlapped relationship of the various gears described above captivate the gears between nut 28 and bracket 58, FIG. 8. Thus, no additional nuts need to be attached to the ends of journals 60 or 62, FIG. 4. The arm 52 then moves the attached gear train assembly 56 vertically upwardly in direction 156, FIG. 4, lifting the entire gear assembly from the nest, transferring the assembly to the receiving location 54, FIG. 1.

The track covers 31, 33, 35, and 37, FIGS. 3 and 6, preclude the gears and nut next adjacent to the nested elements attached to the bracket from lifting off the respective tracks when the bracket assembly 56 is lifted in direction 156, FIG. 8a. The gears especially, due to the friction of the teeth of adjacent gears on a track, may tend to be lifted off the track when the lead gear is lifted. The track covers are sufficiently over those next adjacent gears and nut to prevent that lifting action.

In the embodiment shown, nut 28 is slid onto the journal 64, FIG. 8a, to its fully seated position. At this position, each of the gears 22, 24, and 26 has sufficient play along their journals to allow free rotation of the gears.

However, should it occur that an implementation requires the nut 28 to be recessed in a recess (not shown) in pinion gear 72, then the nut 28 can be positioned so that the gears are loosely captured on their bearings, and, later, when transferred by the robotic arm 52 to another location, the nut 28 can be pushed further onto the journal 64 to its desired seated recessed location.

While the gears in this implementation are spur gears, it is equally apparent that helic gears and other kinds of gears may also be employed. While three gears have been shown, it is apparent that more or fewer gears may be employed in accordance with a given implementation employing one or more nests. Further, while a single gear has been shown attached to a separate corresponding journal, it is apparent that multiple gears may be assembled to a common journal. It is also apparent that while a nut 28 fastens the gear train to the bracket 58, other kinds of fastening elements may be employed.

For example, instead of a nut 28, a fastening plate may be employed which is fed into a corresponding opening (not shown) in the nest 12. That plate may have an opening for engaging and locking one or more of the journals thereto similar to the nut 28 opening 154. In this kind of implementation, the fastening plate may abut but not lock to a plurality of spaced parallel journals in a gear train comprising a large number of gears. In this case, the journals could all abut but not engage that locking plate except for those selected journals which are adapted to pass through aligned locking apertures in that plate. The assembly is then removed from the nest slightly vertical to disengage the gears from their recesses, and when free, moved laterally normal to the vertical directions to slide the plate and gear assembly from the nest. In this embodiment all nest alignment openings would face the same direction, i.e., communicate with a given side of the nest and be adapted to permit the journals to move laterally out of the nest. In the alternative, separate securing shafts can be attached to the gear train bracket for the sole purpose of securing the bracket to such a fastening plate.

The supporting brackets corresponding to bracket 58 could have a number of bosses such as bosses 61, 63, and 65 for engaging a large number of corresponding gears and for locating such gears in the gear train assembly. In this implementation, the journals of the different gears can abut a plate corresponding to the nut 28 for the purpose of captivating a gear not nested by the gears of the gear train assembly. In that way, gears in both nested and unnested spaced relationship can be assembled in a gear train and locked together in a common assembly employing an apparatus constructed and operated in accordance with the present invention.

While a sliding friction nut 28 is illustrated, it is apparent that other kinds of fastening means may be employed, for example, detent elements and the like which may be slid or rotated in place. In those implementations, the nest 12 can include rotating mechanisms, if necessary, for rotating such elements.

In addition to spur gears in a gear train as shown in the present embodiment, planetary gears may also be employed. By way of example, the planets of the planetary gear assembly may be fed similar to gears 22, 24, and 26 and the ring gear may be located by the nest accordingly and the assembly secured by parallel spaced locking plates one of which receives the ring gear. In this arrangement, journals may not be employed. Additional fastening means similar to nut 28 but embodied in a plate as discussed above, may be employed for capturing the gears. In this case, additional nest recesses (not shown) may be provided for such a ring gear and capturing plate.

What is claimed is:

1. A method for assembling a plurality of gears in meshed spaced relation onto a support from which extends in a given direction at least one gear journal for receiving said gears, one gear being positioned in said assembly distal said support relative to the other gears, said other gears being captivated by said one gear and said support, said one gear having a journal bearing mating with one of said at least one gear journal, said method comprising the step of:

continuously feeding said gears in abutting relation into their corresponding assigned location and into in said meshed relation;

continuously feeding journal fastening means to a given location in alignment with said one gear bearing distal said support relative to the one gear when said one gear bearing is engaged with said one of said at least one journal, said fastening means being adapted to lock to said engaged one journal; and passing said one of said at least one journal through the journal bearing of said one gear and then engaging that one passed journal with said fastening means, thereby locking said gears to said support.

2. The method of claim 1 further including the additional step of displacing said fastening means, passed journal and one gear from said given and assigned locations and then repeating the above steps.

3. The method of claim 1 wherein said passing step includes the step of frictionally sliding said one journal into said engagement with said fastening means.

4. Method of meshing a plurality of gears, comprising the steps of:

locating one of at least two gears in a first preassigned location; and feeding and vibrating a second of said at least two gears into a second preassigned location against the one gear, and continually vibrating the second gear, thereby rotating said second gear relative to said one gear when said gears contact and applying a force on said second gear, thereby moving it into a meshed relationship with said one gear when teeth of the second gear are aligned in meshed relation with the teeth of the one gear.

5. Apparatus for assembling a plurality of gears to a support from which at least one gear journal and at least one assembly securing means extend in a given direction, one gear of said plurality of gears having a bearing which mates with said at least one gear journal, and another gear having a bearing which mates with said securing means, said apparatus comprising:

a first alignment means for receiving and locating said plurality of gears in preassigned relative locations in meshed relation, fastening means for capturing the gears between said support and said fastening means;

a second alignment means for receiving and locating said fastening means at a given location relative to said first alignment means, said fastening means being adapted to mate and engage with said securing means; and means for inserting the at least one gear journal into its corresponding mating gear bearing, for inserting the securing means into its corresponding mating gear bearing, and for engaging said securing means with said received fastening means, said second alignment means being located and the received fastening means and said support being positioned and arranged relative to the gears so as to capture the gears between said support and said fastening means when the fastening means engages said securing means.

6. The apparatus of claim 5 further including feed means for feeding and meshing said gears in their assigned locations in the first alignment means, and for feeding said fastening means into its respective assigned location in the second alignment means.

7. The apparatus of claim 4 wherein said feed means includes vibrating means aligned with respective corresponding ones of said alignment means in vibration isolation therefrom for vibratory feeding said gears and fastening means into their corresponding alignment means and for meshing at least a portion of said gears during said feeding.

8. Apparatus for meshing a plurality of gears, comprising:

alignment means for receiving and locating at least two of said gears in preassigned relative locations at which said at least two gears are meshed;

means for placing one of said at least two gears in its preassigned location in said alignment means; and means for feeding and vibrating a second of said at least two gears into its preassigned location against the one gear in the alignment means, and for continually vibrating the second gear to rotate said second gear relative to said one gear when said gears contact, and to apply a force on said second gear to move it into its preassigned meshed location when said teeth on said second gear are aligned in meshed relation with the teeth of the one gear.

9. The apparatus of claim 1 wherein said means for locating said one gear includes means for feeding and vibrating said one gear into its preassigned relative location.

10. The apparatus of claim 1 wherein said feeding and vibrating means includes a vibrating sloping track for supporting and vibrating a column of said second gears.

11. The apparatus of claim 1 wherein said feeding and vibrating means includes at least two vibrating, sloping tracks, each track corresponding to a separate, different gear of said at least two gears, each track including means for supporting a column of gears and for feeding said column, one gear at a time, to said alignment means in a preassigned relative location.

12. The apparatus of claim 1 wherein at least one of said at least two gears has a journal bearing, and further including fastening means; and an alignment means for receiving and locating the fastening means in alignment with said journal bearing.

13. Apparatus for assembling a plurality of gears in meshed spaced relation, comprising:

alignment means for receiving and locating said gears in their corresponding assigned locations in said meshed relation; and feed means for initially vibratory feeding said gears to said alignment means and for then vibratory rotating at least one of said gears into said meshed relation with another of said plurality of gears in response to said vibratory feeding after the at least one gear is fed into said alignment means.

14. The apparatus of claim 13 further including means for assmbling said gears to a support from which extends in a given direction at least one gear journal adapted to receive said gears, one gear being positioned in the assembly comprising the plurality of gears and support distal said support relative to the other gears of the assembly, said other gears being captivated by said one gear and said support, said one gear having a journal bearing mating with said at least one gear journal, alignment means for receiving and locating journal fastening means in alignment with the bearing of said one gear, said fastening means receiving and locking to said one journal distal said support relative to the one gear when engaged with said one journal; and positioning means to releasably secure said support thereto for passing said one journal through the journal bearing of said one gear and into locked engagement with said fastening means to thereby lock all said gears to said support.

15. The apparatus of claim 14 wherein each said gear mates with and rotates about a corresponding, separate different journal, and said fastening means locking only to the one journal corresponding to said one gear.

16. The apparatus of claim 14 wherein said support includes a plurality of gear journals in an array extending therefrom parallel to said one journal, each of said gears comprises a compound gear having at least a pair of connected concentric gears of different diameters and having a common bearing for receiving a corresponding journal of and said array, said alignment means includes means for receiving and locating said gears in said array aligned with said corresponding journals.

17. The apparatus of claim 10 wherein said alignment means includes a plurality of gear locating shoulders each corresponding to a separate, different one of said gears, said shoulder each locating its corresponding gear in a given plane relative to said given direction in abutting relationship thereto, and a plurality of gear locating walls, each gear locating wall being normal to one of said shoulders and abutting a gear surface of its corresponding gear located radially from that corresponding gear's bearing to align that gear relative to the other gears of said plurality of gears.

18. The apparatus of claim 10 wherein said gears each include an annular array of teeth, said alignment means includes a plurality of recesses, each recess corresponding to a separate, different one of said gears, at least two recesses of said plurality of recesses each including a first locating wall for locating its corresponding gear in a first direction and a second locating wall for locating its corresponding gear such that the teeth of the respective corresponding gears of the at least two recesses mesh.

19. The apparatus of claim 13 wherein said vibrating feed means includes means for spacing said feed means in vibration isolation relative to said alignment means.

* * * * *